United States Patent [19]

Kamata

[11] Patent Number: 4,942,952

[45] Date of Patent: Jul. 24, 1990

[54] CENTRIFUGAL CLUTCH

[75] Inventor: Yoshikiyo Kamata, Hachioji, Japan

[73] Assignee: Kioritz Corporation, Tokyo, Japan

[21] Appl. No.: 354,961

[22] Filed: May 22, 1989

[30] Foreign Application Priority Data

May 26, 1988 [JP] Japan ............................ 63-69768[U]

[51] Int. Cl.[5] ............................................ F16D 43/18

[52] U.S. Cl. ............................................ 192/105 CD

[58] Field of Search ................................ 192/105 CD

[56] References Cited

U.S. PATENT DOCUMENTS

| | | | |
|---|---|---|---|
| 2,038,450 | 4/1936 | Roesch | 192/105 CD |
| 2,485,211 | 10/1949 | Mesh | 192/105 CD |
| 2,596,193 | 5/1952 | Zieg | 192/105 CD |
| 3,144,110 | 8/1964 | Van Doorne | 192/105 CD |
| 3,712,438 | 1/1973 | Roddy et al. | 192/105 CD |
| 4,483,279 | 11/1984 | Kohler et al. | 123/41.65 |

FOREIGN PATENT DOCUMENTS

| | | | |
|---|---|---|---|
| 1239896 | 5/1967 | Fed. Rep. of Germany | 192/105 CD |
| 1336304 | 7/1963 | France | 192/105 CD |

OTHER PUBLICATIONS

Roberts and Lapidge, *Manufacturing Processes*, McGraw Hill Book Company, 1977, pp. 49, 50.

*Primary Examiner*—Leslie A. Braun
*Assistant Examiner*—Andrea Pitts
*Attorney, Agent, or Firm*—Browdy and Neimark

[57] ABSTRACT

A centrifugal clutch is disclosed in which a clutch boss rotatably supported to a drive side fixture has in its center an axial center hole. A clutch drum shaft has an inner end portion having an outer diameter somewhat smaller than an inner diameter of the center hole of the clutch boss. The inner end portion of the clutch drum shaft is arranged in the center hole of the clutch boss with a clearance. The driven side fixture and the drive side fixture are adjustable in relative position to each other.

1 Claim, 2 Drawing Sheets

CENTRIFUGAL CLUTCH

BACKGROUND OF THE INVENTION

The present invention relates to a centrifugal clutch, and more particularly to a clutch incorporated into a power transmission system for transmitting a driving force generated by a power generator such as an internal combustion engine to a working tool in a working machine such as a grass trimmer.

In a centrifugal clutch, a clutch boss on which clutch shoes are provided is used as a drive member fixed to an output shaft of a power generator such as an internal combustion engine, and a clutch drum shaft of a clutch drum is used as a driven member positioned in coaxial alignment with the clutch boss. Under this condition, a driven side fixture for rotatably supporting the clutch drum shaft is fixed to a drive side fixture such as an engine body. During the operation of the clutch shoes of the clutch boss, the centrifugal force causes the clutch drum to uniformly firctionally engaged with the clutch shoes on its inner circumferential surface, to thereby smoothly transmit driving force from the clutch boss side to the clutch drum side and suppress the generation of vibration as much as possible. Conventionally, the coaxial alignment of the clutch drum shaft relative to the clutch boss has been performed by providing positioning means such as knock pins to the drive side fixture and the driven side fixture and aligning the positioning means with each other for coupling the driven side fixture to the drive side fixture. However, in such a conventional coaxial alignment, it is necessary to provide the positioning means such as knock pins to both the fixtures. In addition, the positioning means per se must be arranged with high precision. This is troublesome and time-consuming in manufacture and would lead to an increased cost.

SUMMARY OF THE INVENTION

Accordingly, in order to overcome the above-noted defects inherent in the prior art, an object of the invention is provide a centrifugal clutch that is simple in structure and manufactured in low cost.

Namely, according to the invention, there is provided a centrifugal clutch which comprises: a clutch boss rotatably supported to a drive side fixture; a clutch drum shaft rotatably supported to a driven side fixture and aligned coaxially with the clutch boss; and a clutch drum mounted on the clutch drum shaft for receiving transmitted drive force from said clutch boss, characterized in that the clutch boss has in its center an axial center hole; the clutch drum shaft has an inner end portion having an outer diameter somewhat smaller than an inner diameter of the center hole of the clutch boss; the inner end portion of the clutch drum shaft is arranged in the center hole of the clutch boss with a clearance; and the driven side fixture and the drive side fixture are adjustable in relative position to each other.

Accordingly, in the assembling operation of the centrifugal clutch, a rod-like tool is inserted into the clutch drum shaft, and the clutch drum is held in a position where the drum shaft may be smoothly rotated without contact of the inner end portion of the clutch drum shaft with an inner surface of the center hole of the clutch boss. Under this condition, the drive side fixture and the driven side fixture are fixed to each other, thereby readily performing the coaxial alignment of the clutch drum shaft. It is unnecessary to provide a special means for the coaxial alignment. This may lead to the simple structure and low cost. The vibration or frictional wear during the operation may be suppressed as much as possible.

DESCRIPTION OF THE PREFERRED EMBODIMENTS

The present invention will now be described with reference to the accompanying drawings.

Figure 2:
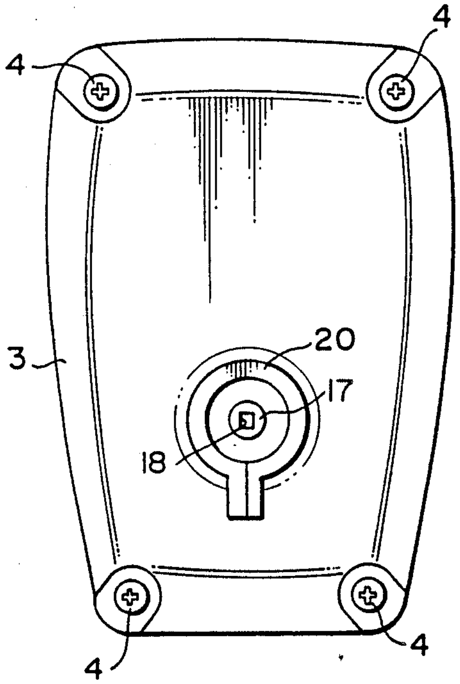
FIG. 2 is a front end view of FIG. 1.

There is shown an embodiment of the invention which is applied to a centrifugal clutch of a grass trimmer. In the grass trimmer, an air cooled two cycle internal combustion engine 1 is mounted as a power generator to a rear portion of an operating rod (not shown). The engine 1 is fixed within a body cover 2 surrounding the engine 1. The body cover 2 has an open front portion that is covered by a front cover 3. The latter is adjustably fixed to the body cover 2 by a plurality of bolts 4 (FIG. 2) each of which passes through the front cover 3 to threadedly engage with the body cover 2.

A crankshaft 5 of the engine 1 is supported rotatably to a crankcase 7 and extends forwardly. A clutch boss 10 of a centrifugal clutch 9 is threadedly fixed to a threaded front end 8 of the crankshaft 5. The clutch boss 10 is rotated together with the crankshaft 5. A plurality of spring-biased clutch shoes 11 are pivotably or slidably mounted on an outer periphery of the clutch boss 10. The respective clutch shoes 11 are movable radially outwardly against the spring force by the centrifugal force during the rotation of the clutch boss 10.

A clutch drum 12 of the centrifugal clutch 9 has in its center a clutch drum shaft 13 fixed thereto. The clutch drum shaft 13 is rotatably supported within the front cover 3 by a bearing 14. The clutch drum shaft 13 is arranged in a coaxial relation with the crankshaft 5. Also, an inner end portion 15 of the clutch drum shaft 13 has an outer diameter somewhat smaller than an inner diameter of an axial center hole 16 formed in the center of the clutch boss 10. It should be noted that the inner end portion 15 is inserted into the center hole 16 while keeping a small clearance therebetween so that the inner end portion 15 is not contacted with the clutch boss 10. The clearance between the outer peripheral surface of the inner end portion 15 of the clutch drum shaft 13 and the inner circumferential surface of the center hole 16 of the clutch boss 10 is preferably in a range of about 0.02 to 0.1 mm, so that the clutch boss 10 and the clutch drum shaft 13 may be rotated independently of each other. A non-circular hole 18 is formed in an outer end portion 17 of the clutch drum shaft 13 for the insertion and coupling with a power transmission shaft (not shown) arranged in the operating rod.

Figure 1:
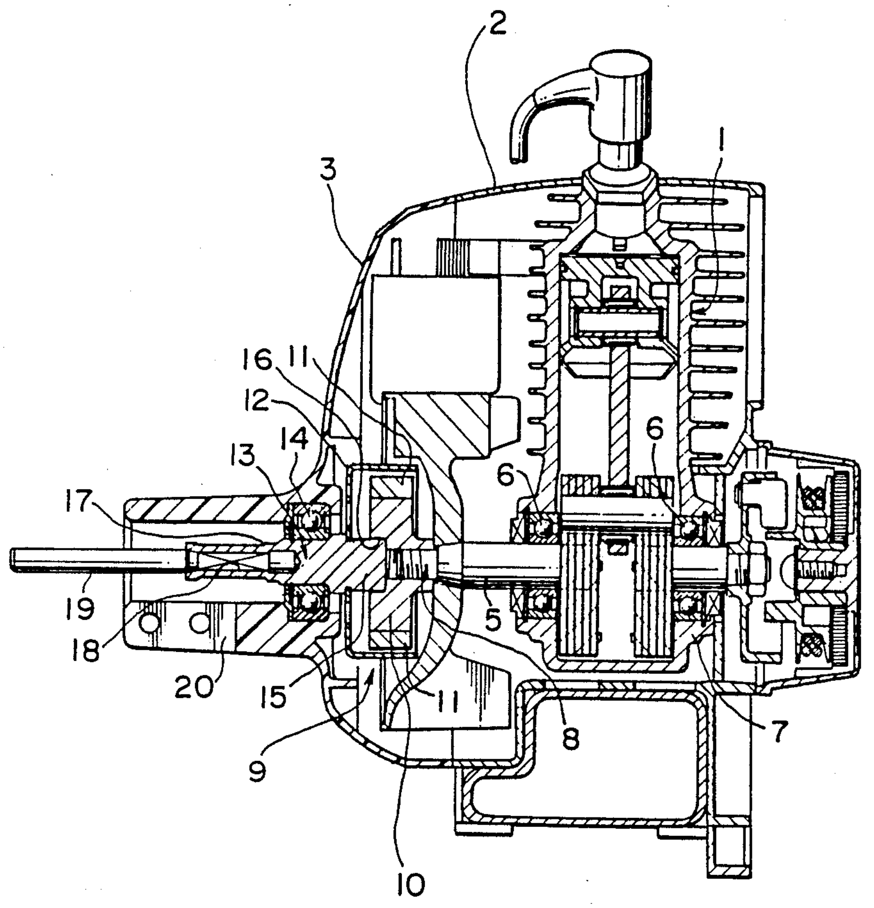
FIG. 1 is a cross-sectional view showing a primary part of a centrifugal clutch according to the invention during the assembling operation.

In the assembling operation, a rod-like tool 19 is inserted into the non-circular hole 18 of the outer end portion 17 of the clutch drum shaft 13 as show in FIG. 1. Then, the clutch drum 12 and the clutch drum shaft 13 are manually rotated relative to the clutch boss 10 fixed to the crankshaft 5. At this time, by the worker's feeling transmitted to his hand, it is possible to confirm that the clutch drum shaft 13 is smoothly rotated without the inner end portion 15 of the clutch drum shaft 13 being in contact with the surface of the center hole 16 of the clutch boss 10. Then, under such a condition, the bolts 4 are fastened for fixing the front cover 3 to the body cover 2.

Thus, it is possible to readily perform the accurate coaxial alignment of the clutch drum 12 and the clutch drum shaft 13, which are the driven side members of the centrifugal clutch 9, relative to the clutch boss 10 which is the drive side member of the centrifugal clutch 9. Then, the front cover 3 which is the driven side fixture may be fixed to the body cover 2 which is the drive side fixture, thereby holding the centrifugal clutch in a desired condition.

After the assembling, the rear portion of the operating rod is mounted to an operating rod mount portion 20 of the front cover 3, and simultaneously, the power transmission shaft is connected to the outer end portion 17 of the clutch drum shaft 13 to thereby complete the manufacturing of the grass trimmer.

What is claimed is:

1. A centrifugal clutch comprising: a clutch boss rotatably and axially fixed supported to a drive side fixture; a clutch drum shaft rotatably supported to a driven side fixture and aligned coaxially with said clutch boss; clutch shoes movable radially outwardly by centrifugal force during rotation of said clutch boss; means for manually adjusting the coaxial alignment of said clutch drum and said clutch boss; and a clutch drum mounted on said clutch drum shaft for receiving transmitted drive force from said clutch boss through said clutch shoes, wherein said clutch boss has in its center an axial center hole; said clutch drum shaft has an inner end portion having an outer diameter somewhat smaller than an inner diameter of said center hole of said clutch boss; the inner end portion of said clutch drum shaft is arranged in the center hole of said clutch boss with a clearance for manual adjustment of the coaxial alignment of said clutch; and said driven side fixture and said drive side fixture are adjustable in relative position to each other.

* * * * *